United States Patent
Barbone et al.

(10) Patent No.: US 11,979,062 B2
(45) Date of Patent: May 7, 2024

(54) ROTOR ASSEMBLY FOR TURBOMACHINE HAVING ELECTRIC MOTOR WITH SOLITARY SOLID CORE PERMANENT MAGNET

(71) Applicant: Garrett Transportation I Inc, Torrance, CA (US)

(72) Inventors: Maurizio Barbone, Torrevecchia Teatina (IT); Jean Luc Perrin, Capavenir Vosges (FR); Jeffrey A. Lotterman, Los Angeles, CA (US); Martin Tóth, Michalovce (SK); Patrick Beresewicz, Whittier, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 161 days.

(21) Appl. No.: 17/645,458

(22) Filed: Dec. 22, 2021

(65) Prior Publication Data
US 2023/0198326 A1    Jun. 22, 2023

(51) Int. Cl.
| | |
|---|---|
| *H02K 1/278* | (2022.01) |
| *F01D 15/10* | (2006.01) |
| *H02K 1/28* | (2006.01) |
| *H02K 7/00* | (2006.01) |
| *H02K 15/03* | (2006.01) |

(52) U.S. Cl.
CPC ............ *H02K 1/278* (2013.01); *F01D 15/10* (2013.01); *H02K 1/28* (2013.01); *H02K 7/003* (2013.01); *H02K 15/03* (2013.01); *F05D 2220/40* (2013.01); *F05D 2220/768* (2013.01); *F05D 2240/60* (2013.01); *F05D 2260/37* (2013.01)

(58) Field of Classification Search
CPC .......... H02K 1/278; H02K 1/28; H02K 7/003; H02K 15/03; H02K 7/14; H02K 7/1823; H02K 1/2726; F01D 15/10; F05D 2220/40; F05D 2220/768; F05D 2240/60; F05D 2260/37
See application file for complete search history.

(56) References Cited

U.S. PATENT DOCUMENTS

| | | | |
|---|---|---|---|
| 5,964,663 A | 10/1999 | Stewart et al. | |
| 6,997,656 B2 | 2/2006 | Bengston et al. | |
| 8,569,920 B2 | 10/2013 | Ramon et al. | |
| 10,578,117 B2 | 3/2020 | Barthes et al. | |
| 2010/0176562 A1 | 7/2010 | Linzell | |
| 2014/0056721 A1* | 2/2014 | Garrard | F04D 29/5806 29/598 |
| 2021/0044164 A1 | 2/2021 | Sarikhani et al. | |
| 2022/0209598 A1* | 6/2022 | Boxberg | H02K 7/003 |

FOREIGN PATENT DOCUMENTS

JP        6580844 B2     9/2019

* cited by examiner

Primary Examiner — Christopher M Koehler
Assistant Examiner — Riley Owen Stout
(74) Attorney, Agent, or Firm — LORENZ & KOPF, LLP

(57) ABSTRACT

A rotor assembly for a turbomachine having a permanent magnet electric motor that defines an axis of rotation includes a jacket member. The rotor assembly also includes a magnet member that is received within the jacket member. The magnet member has a first longitudinal end and a second longitudinal end that are separated along the axis of rotation. The rotor assembly also includes a first shaft structure that is attached to the first longitudinal end and a second shaft structure that is attached to the second longitudinal end. The magnet member is solitary and unitary and has a solid core.

18 Claims, 3 Drawing Sheets

ROTOR ASSEMBLY FOR TURBOMACHINE HAVING ELECTRIC MOTOR WITH SOLITARY SOLID CORE PERMANENT MAGNET

TECHNICAL FIELD

The present disclosure generally relates to a rotor assembly and, more particularly, to a rotor assembly for a turbomachine having an electric motor with a solitary solid core permanent magnet.

BACKGROUND

Permanent magnet electric motors may be used in a variety of applications. For example, these motors may be included in a turbomachine, such as a turbocharger equipped with an electric motor, an e-compressor, etc. These motors provide high efficiency operation as well as other advantages.

However, many permanent magnet electric motors have deficiencies. Manufacturing methods may be highly complex, labor-intensive, and/or have other inefficiencies. There may be a large number of parts included, which increases costs and complexity. Also, it may be necessary to hold parts to relatively high tolerances, which increases manufacturing complexity and cost.

Thus, it is desirable to provide a high-quality and robust permanent magnet electric motor that may be manufactured in a highly efficient manner. Other desirable features and characteristics of the present disclosure will become apparent from the subsequent detailed description and the appended claims, taken in conjunction with the accompanying drawings and this background discussion.

BRIEF SUMMARY

In one embodiment, a rotor assembly for a turbomachine having a permanent magnet electric motor that defines an axis of rotation is disclosed. The rotor assembly includes a jacket member. The rotor assembly also includes a magnet member that is received within the jacket member. The magnet member has a first longitudinal end and a second longitudinal end that are separated along the axis of rotation. The rotor assembly also includes a first shaft structure that is attached to the first longitudinal end and a second shaft structure that is attached to the second longitudinal end. The magnet member is solitary and unitary and has a solid core.

In another embodiment, a method of manufacturing a rotor assembly for a turbomachine having a permanent magnet electric motor defining an axis of rotation is disclosed. The method includes providing a jacket member. The method also includes providing a magnet member having a first longitudinal end and a second longitudinal end that are separated along the axis of rotation. Furthermore, the method includes attaching a first shaft structure to the first longitudinal end and attaching a second shaft structure to the second longitudinal end. The method also includes receiving the magnet member within the sleeve member after attaching the first shaft structure to the first longitudinal end and after attaching the second shaft structure to the second longitudinal end. The magnet member is solitary and unitary and has a solid core.

In an additional embodiment, a turbomachine is disclosed. The turbomachine includes a housing and a permanent magnet electric motor housed within the housing. The turbomachine further includes a rotating group supported for rotation about an axis of rotation and configured to be driven in rotation about the axis of rotation by the motor. The rotating group includes a rotor assembly. The rotor assembly includes a jacket member and a magnet member that is received within the jacket member. The magnet member has a first longitudinal end and a second longitudinal end that are separated along the axis of rotation. Furthermore, the rotor assembly includes a first shaft structure that is attached to the first longitudinal end and a second shaft structure that is attached to the second longitudinal end. The magnet member is solitary and unitary and has a solid core.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, high efficiency permanent magnet electric motor with a rotor assembly that has improved manufacturability as well as other benefits. The rotor assembly may be incorporated within a turbomachine, such as a turbocharger, fluid compressor, supercharger, etc. Also, the rotor assembly may include a single, solitary magnet member for a motor section of the turbomachine, and the assembly may further include at least one shaft structure (i.e., spacer) that extends from one longitudinal end of the magnet member. The rotor assembly may additionally include a sleeve member that receives the magnet member and the shaft structure(s).

The magnet member of the present disclosure may be solitary (i.e., the sole magnet of the rotor assembly). The magnet member may be unitary (i.e., a single, one-part magnet member). The magnet member may have a solid core (i.e., may have a solid cross section, may be boreless and not hollow).

Accordingly, as will be discussed, the rotor assembly of the present disclosure provides a number of benefits. The magnet member of the present disclosure may provide manufacturing efficiencies, may reduce part count, and/or provide other benefits. The rotor assembly may be manufactured efficiently, accurately, and in a repeatable fashion.

Figure 1:
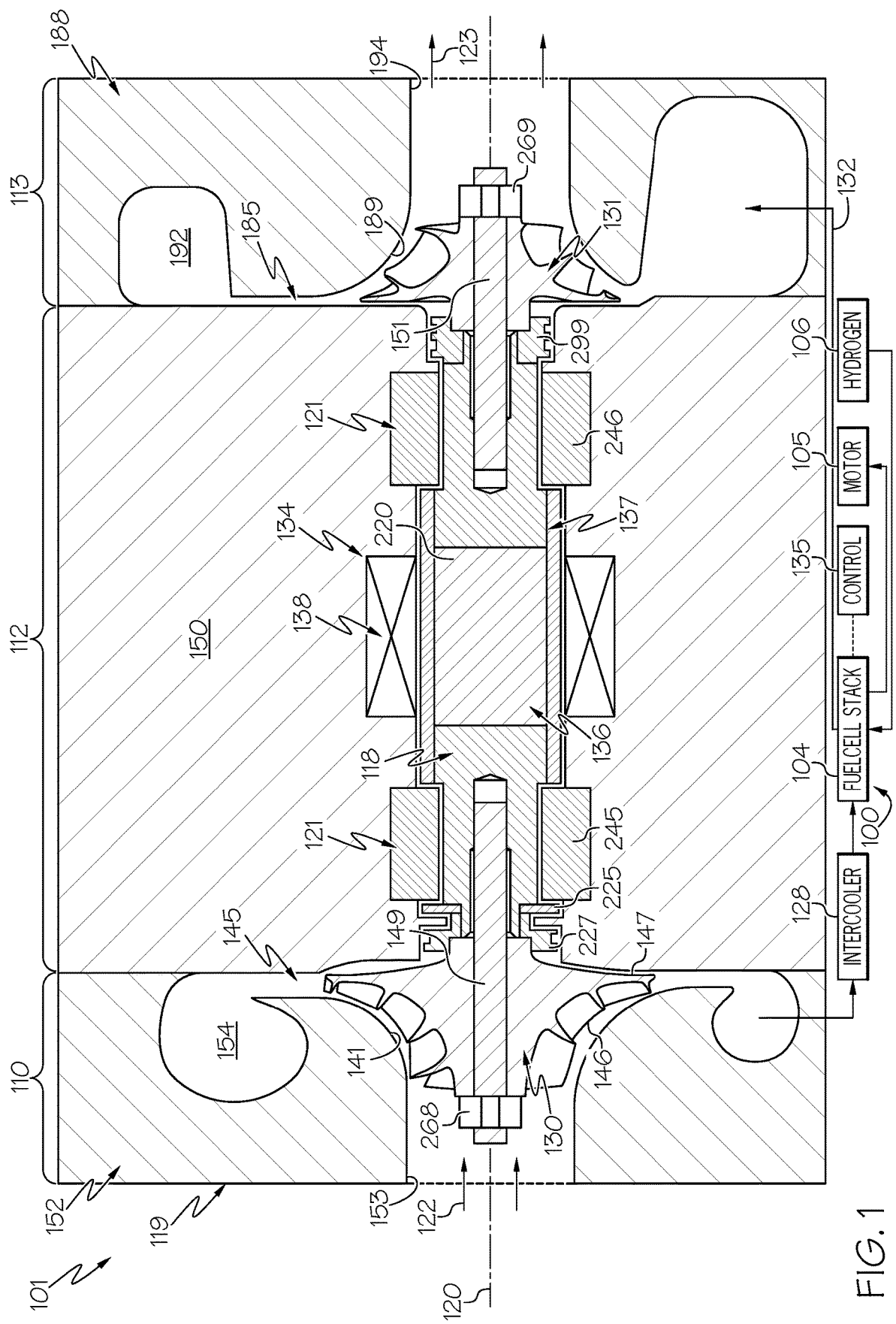
FIG. 1 is a schematic view of a turbomachine of a fuel cell system, wherein the turbomachine includes a permanent magnet electric motor according to example embodiments of the present disclosure.

Referring initially to FIG. 1, a turbomachine 101 is shown according to example embodiments. As shown, the turbomachine 101 generally includes a housing 119 (shown schematically) and a rotating group 118 supported for rotation within the housing 119 about an axis of rotation 120 by one or more bearings 121. In some embodiments, the rotating group 118 and the housing 119 may cooperatively define a compressor section 110 and a turbine section 113. Also, a motor section 112 of the turbomachine 101 may be disposed axially between the compressor and turbine sections 110, 113.

The turbomachine 101 may be operatively connected to a fuel cell system 100 and may be configured as an e-charger, electric turbocharger, or other electric motorized compressor device for the fuel cell system 100. However, it will be appreciated that the turbomachine 101 may configured differently from the embodiments shown and that the turbomachine 101 may be incorporated in another system (e.g., in an internal combustion engine system) without departing from the scope of the present disclosure. Furthermore, in some embodiments, elements of the motor section 112 may be included in a device other than a turbomachine without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle. In some embodiments, the electric motor 105 may include the jacket member of the present disclosure that is described below in association with the motor section 112.

Oxygen may be provided to the fuel cell stack 104, at least in part, by the turbomachine 101. More specifically, the motor section 112 may drive rotation of the rotating group 118, and the compressor section 110 may provide a compressed air stream to an intercooler 128 as it flows to the stack 104, and exhaust from the stack 104 may be fed back to the turbine section 113 for providing power assist to the motor section 112. It will be appreciated, however, that other embodiments of the turbomachine 101 fall within the scope of the present disclosure. For example, in some embodiments, the turbine section 113 may be omitted such that the turbomachine 101 includes the motor section 112 as well as the compressor section 110. Additionally, in some embodiments, the turbomachine 101 may include a plurality of sections, such as a plurality of compressor sections that are fluidly connected in succession to include a first (low pressure) stage that feeds a second (high pressure) stage that ultimately feeds the fuel cell system 100. In further embodiments, the turbomachine 101 may be provided in systems other than the fuel cell system 100 without departing from the scope of the present disclosure.

As schematically illustrated in FIG. 1, the housing 119 of the turbomachine 101 may include a compressor housing 152, a motor housing 150, and a turbine housing 188. The compressor housing 152 may define part of the compressor section 110, the motor housing 150 may define part of the motor section 112, and the turbine housing 188 may define part of the turbine section 113. These parts of the housing 119 may be assembled together as detailed below to house the rotating group 118.

The compressor housing 152 may include one or more parts that define an inlet 153 extending along and centered on the axis 120. The compressor housing 152 may also include a convex compressor shroud surface 141 that is positioned in a downstream direction from the inlet 153. The shroud surface 141 may oppose a compressor wheel 130 of the rotating group 118 and may have inverse contour relative thereto. The compressor housing 152 also may include a volute passage 154 that extends about the axis 120 and that is positioned downstream from the shroud surface 141. The volute passage 154 may be fluidly connected to the intercooler 128 for providing fluid flow thereto.

The motor housing 150 may include one or more parts that define a cavity for receiving and housing one or more parts of a motor 134 (e.g., an electric motor). In some embodiments, the motor housing 150 may house and support a motor stator member 138, whereas a motor rotor member 136 may be supported on the rotating group 118. As shown, the stator member 138 may surround the motor rotor member 136 circumferentially about the axis 120.

The motor rotor member 136 may define at least part of a rotor assembly 137 of the turbomachine 101. The rotor assembly 137 is shown in isolation in FIG. 2 and will be discussed in detail below according to example embodiments. Referring back to FIG. 1, a first shaft member 149 of the rotating group 118 may be fixed to one end of the rotor assembly 137 and may extend axially therefrom to operatively connect the rotor assembly 137 to the compressor wheel 130 for rotating as a unit.

The compressor housing 152 may be fixed to one axial face of the motor housing 150. As such, the compressor housing 152 may cover over a front side 146 of the compressor wheel 130, and a back side 147 of the compressor wheel 130 may face toward the motor section 112. Furthermore, in some embodiments, the compressor housing 152 and the motor housing 150 may cooperatively define a diffuser area 145 of the flow path of the compressor section 110. The diffuser area 145 may be disposed along the flow path between the compressor wheel 130 and the volute passage 154 (i.e., between the compressor wheel 130 and the volute passage 154).

Additionally, the housing 119 may include the turbine housing 188. The turbine housing 188 may include a circumferential inlet passage 192 that extends about the axis 120. As represented in FIG. 1, the passage 192 may be a volute passage in which the cross sectional area gradually changes as it extends about the axis 120. In other embodiments, the passage 192 may be toroidal such that the cross sectional area remains substantially the same as it extends about the axis 120. The passage 192 may be fluidly connected to the fuel cell stack 104 to receive exhaust therefrom. The turbine housing 188 may also include a convex turbine shroud surface 189 that is positioned in a downstream direction from the circumferential inlet passage 192. A second shaft member 151 of the rotating group 118 may be fixed to the rotor assembly 137 and may extend axially therefrom to operatively connect the rotor assembly 137 to a turbine wheel 131 for rotating as a unit. As such, the turbine wheel 131 may be operatively attached to the motor 134 and the compressor wheel 130. The turbine shroud surface 189 may oppose the turbine wheel 131 of the rotating group 118 and may have inverse contour relative thereto. The turbine housing 188 also may include an outlet passage 194 that extends along and that is centered on the axis 120. The outlet passage 194 may be positioned downstream from the turbine shroud surface 189. The turbine housing 188 may be fixed to the axial face of the motor housing 150 that is opposite to the one supporting the compressor housing 152. In some embodiments, the turbine housing 188 and the motor housing 150 may cooperatively define an inlet area 185 of the turbine section 113. The inlet area 185 may be disposed in the flow path of the turbine section 113, positioned downstream of the passage 192 and upstream from the turbine wheel 131 (i.e., between the passage 192 and the turbine wheel 131).

The bearing 121 of the turbomachine 101 supports the rotating group 118 (including the compressor wheel 130 and the turbine wheel 131) for rotation within the housing 119. The bearing 121 may have various configurations without departing from the scope of the present disclosure. In the illustrated embodiment, the bearing 121 is an air bearing, journal bearing, plain bearing, etc. However, it will be appreciated that the bearing 121 may include roller elements or may be configured otherwise. The bearing may 121 also include an oil-fed journal bearing of various architectures (e.g., fully floating, semi-floating, split, coupled, etc.). Moreover, the bearing 121 may include an oil-fed rolling element bearing in some embodiments.

During operation of the turbomachine 101, an inlet airstream (represented by arrows 122 in FIG. 1) may flow into the inlet 153, and the inlet airstream 122 may be compressed as it flows downstream between the compressor wheel 130 and the shroud surface 141, through the diffuser area 145, and into the volute passage 154. A compressed airstream (represented by arrow 124) may exit the volute passage 154 and may be directed to the intercooler 128 and then to the fuel cell stack 104 for boosting the operating efficiency of the fuel cell system 100. Furthermore, in some embodiments, an exhaust gas stream (represented by arrow 132) from the fuel cell stack 104 may be directed back toward the turbomachine 101 and received by the passage 192 of the turbine section 113. The exhaust gas stream 132 may flow through the inlet area 185 to the turbine wheel 131 and may drive rotation of the turbine wheel 131 before flowing to the outlet passage 194 as represented by arrows 123. Mechanical power from the turbine section 113 may be converted to electrical power for the motor 134 for ultimately assisting in rotation of the compressor wheel 130.

Various components of the fuel cell system 100 and/or the turbomachine 101 may be controlled by a control system 135. The control system 135 may be a computerized system with a processor, various sensors, and other components for electrically controlling operation of the motor 134, the fuel cell stack 104, and/or other features of the system 100. In some embodiments, the control system 135 may define or may be part of the electrical control unit (ECU) of a vehicle.

Figure 2:
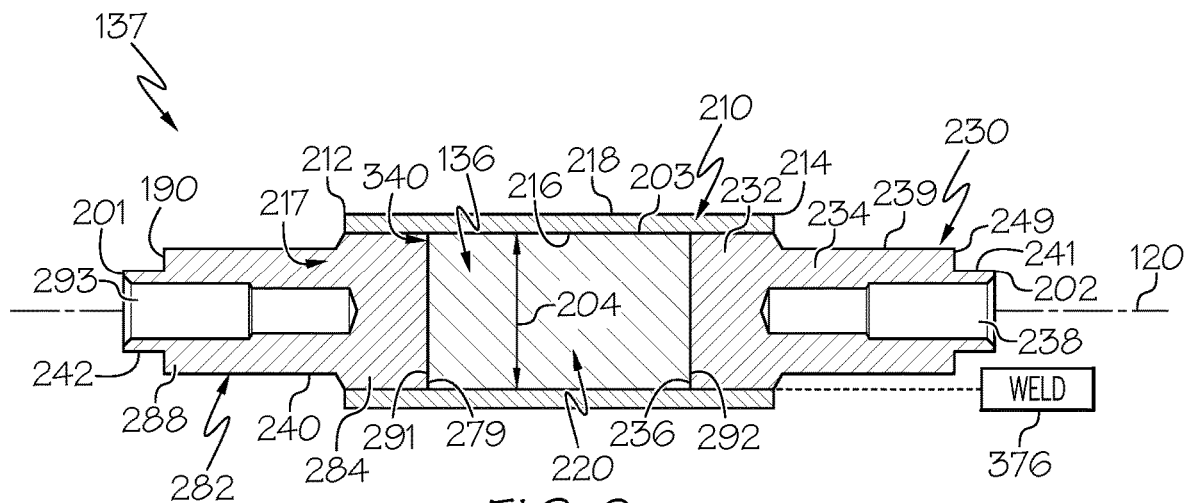
FIG. 2 is a longitudinal cross-section of a rotor assembly of the permanent magnet electric motor of FIG. 1.

Referring now to FIG. 2, the rotor assembly 137 will be discussed in greater detail according to example embodiments of the present disclosure. As mentioned above, the rotor assembly 137 may include and/or may be defined partly by the rotor member 136 of the motor 134. The rotor assembly 137 may also define part of and/or support the rotating group 118.

As shown in FIG. 2, the rotor assembly 137 may be elongate and cylindrical and centered on the axis 120. The rotor assembly 137 may include a first end 201 and a second end 202, which are separated along the axis 120. The first end 201 may receive and attach to the first shaft member 149 of the rotating group 118, and the second end 202 may receive and attach to the second shaft member 151 of the rotating group 118 (FIG. 1).

As shown, the rotor assembly 137 may include a jacket member 210. The jacket member 210 may be a unitary, hollow tube. In some embodiments, the jacket member 210 may be centered about the axis 120. Also, the jacket member 210 may be substantially centered longitudinally between the first end 201 and the second end 202. The jacket member 210 may include a first end 212 and a second end 214 that are spaced apart along the axis 120. The jacket member 210 may also include an inner surface 216 (inner diameter surface) that faces and encircles the axis 120. The jacket member 210 may also include an outer surface 218 (outer diameter surface) that faces outward radially from the axis 120. The inner and/or outer surfaces 216, 218 may be smooth and continuous in some embodiments. Also, in some embodiments, the diameters of the inner surface 216 and the outer surface 218 may be substantially constant along a majority of the length. In some embodiments, the inner and outer surfaces 216, 218 may be substantially constant (within reasonable manufacturing tolerances) along the entire length with the exception of lead-in chamfers or other similar features at the ends 212, 214 of the jacket member 210. Furthermore, the inner surface 216 may define a central bore 217 extending axially through the jacket member 210.

The rotor assembly 137 may further include a magnet member 220. The magnet member 220 may be a two-pole permanent magnet and may be operably coupled to the stator member 138 for operation of the motor 134. The magnet member 220 may be unitary, one-piece, and monolithic. The magnet member 220 may be the sole or solitary magnet member of the rotor assembly 137. The magnet member 220 may be cylindrical with a circular cross section taken normal to the axis 120 (e.g., a right circular cylinder). The magnet member 220 may have a closed first end 291 and a closed second end 292. The magnet member 220 may also have an outer diameter surface 203. The outer diameter surface 203 may define an outer diameter 204 dimension of the magnet member 220. The outer diameter 204 may be substantially constant along the majority of the longitudinal length of the magnet member 220 (e.g., along the entire length thereof).

The magnet member 220 may be a solid core cylinder such that the magnet member 220 has a solid cross section. In other words, the circular cross section may be solid and continuous from the first end 291 to the second end 292. As such, the magnet member 220 may be considered "boreless" in that there is no bore extending longitudinally through the magnet member 220.

During manufacture, the magnet member 220 may be sintered and the exterior surface(s) of the magnet member 220 may be subsequently machined as discussed in detail below. However, as represented in FIGS. 1 and 2, the magnet member 220 may have a solid core, and a bore extending through the magnet member 220 (e.g., for receiving a centering pin or other similar component) is unnecessary. Thus, the magnet member 220 may be manufactured with high efficiency, repeatability, and accuracy.

The magnet member 220 may be received within the jacket member 210. For example, the outer diameter 204 of the magnet member 220 may correspond to the inner diameter of the inner surface 216 of the jacket member 210 to attach these components. In some embodiments, the outer diameter surface 203 of the magnet member 220 may abut against the inner surface 216 of the jacket member 210. Furthermore, in some embodiments, the outer diameter 204 may be slightly larger than the inner diameter of the jacket member 210 to establish an interference fit therebetween.

The rotor assembly 137 may further include a first shaft structure 282 (i.e., first spacer). The first shaft structure 282 may be a unitary, one-piece cylindrical member that is made from strong and substantially rigid metallic material. The first shaft structure 282 may have a circular cross section taken normal to the axis 120. The diameter of the first shaft structure 282 may vary along its longitudinal length. For example, the first shaft structure 282 may include a base 284 and a stub 288, and the base 284 may have a larger diameter than the stub 288.

The base 284 may be disc-shaped with a circular cross section. The base 284 may have an outer diameter that is substantially equal to the outer diameter 204 of the magnet member 220. The base 284 may be attached to the jacket member 210. For example, the base 284 may be received in the jacket member 210, the base 284 may be interference fit to the jacket member 210, and/or the base 284 may be welded to the jacket member 210. Moreover, a longitudinal face 279 of the base 284 may be attached to the first end 291 of the magnet member 220. For example, the longitudinal face 279 may be adhesively attached to the first end 291.

The stub 288 may project axially from the base 284 and may project out of and away from the jacket member 210 and magnet member 220. The stub 288 may define the first end 201 of the rotor assembly 137. Also, a blind hole 293 may be centered on the axis 120 and may extend partly into the first shaft structure 282 from the first end 201. The blind hole 293 may extend through the stub 288 and the bottom of the blind hole 293 may be defined in or proximate the base 284. The blind hole 293 may be configured for receiving and attaching to the first shaft member 149 (FIG. 1). The stub 288 may include a bearing outer diameter surface 240 and an end outer diameter surface 242. The end outer diameter surface 242 may be defined proximate the first end 201 and may be smaller than the bearing outer diameter surface 240. The bearing outer diameter surface 240 may be disposed axially between the end outer diameter surface 242 and the base 284.

The bearing outer diameter surface 240 may be sized and configured for receiving a first journal bearing member 245 of the bearing 121 (FIG. 1) and for supporting rotation of the rotating group 118. A shoulder 190 may be defined at a longitudinal transition between the end outer diameter surface 242 and the bearing outer diameter surface 240. The shoulder 190 may provide axial support to a thrust disc 225 of the bearing 121, an annular spacer 227, and the compressor wheel 130 (FIG. 1). On the end of this stack-up, a nut 268 or another fastener may be affixed to the shaft member 149.

The rotor assembly 137 may further include a second shaft structure 230. The second shaft structure 230 may be substantially similar to (e.g., a mirror image of) the first shaft structure 282. As such, the second shaft structure 230 may be a unitary, one-piece cylindrical member that is made from strong and substantially rigid metallic material. The second shaft structure 230 may have a circular cross section taken normal to the axis 120. The diameter of the second shaft structure 230 may vary along its longitudinal length. For example, the second shaft structure 230 may include a base 232 and a stub 234, and the base 232 may have a larger diameter than the stub 234.

The base 232 may be disc-shaped with a circular cross section. The base 232 may have an outer diameter that is substantially equal to the outer diameter 204 of the magnet member 220. The base 232 may be attached to the jacket member 210. For example, the base 232 may be received in the jacket member 210, the base 232 may be interference fit to the jacket member 210, and/or the base 232 may be welded to the jacket member 210. Moreover, a longitudinal face 236 of the base 232 may be attached to the second end 292 of the magnet member 220 (e.g., adhesively attached).

The stub 234 may project axially from the base 232 and may project out of and away from the jacket member 210. The stub 234 may define the second end 202 of the rotor assembly 137. Also, a blind hole 238 may be centered on the axis 120 and may extend partly into the second shaft structure 230 from the second end 202. The blind hole 238 may extend through the stub 234 and the bottom of the blind hole 238 may be defined in or proximate the base 232. The blind hole 238 may be configured for receiving and attaching to the second shaft member 151 (FIG. 1). The stub 234 may include a bearing outer diameter surface 239 and an end outer diameter surface 241. The end outer diameter surface 241 may be defined proximate the second end 202 and may be smaller than the bearing outer diameter surface 239. The bearing outer diameter surface 239 may be disposed axially between the end outer diameter surface 241 and the base 232.

The bearing outer diameter surface 239 may be sized and configured for receiving a second journal bearing member 246 of the bearing 121 (FIG. 1) and for supporting rotation of the rotating group 118. A shoulder 249 may be defined at a longitudinal transition between the end outer diameter surface 241 and the bearing outer diameter surface 239. The shoulder 249 may provide axial support for an annular spacer 299 and the turbine wheel 131 (FIG. 1). On the end of this stack-up, a nut 269 or another fastener may be affixed to the shaft member 151.

Assembled in this fashion, the rotor assembly 137 may position and support the magnet member 220 at a precise, predetermined position relative to the stator member 138 of the motor 134. The magnet member 220 may be robustly supported within the motor 134, and the rotor assembly 137 may support the rotating group 118 robustly as well.

Figure 3:
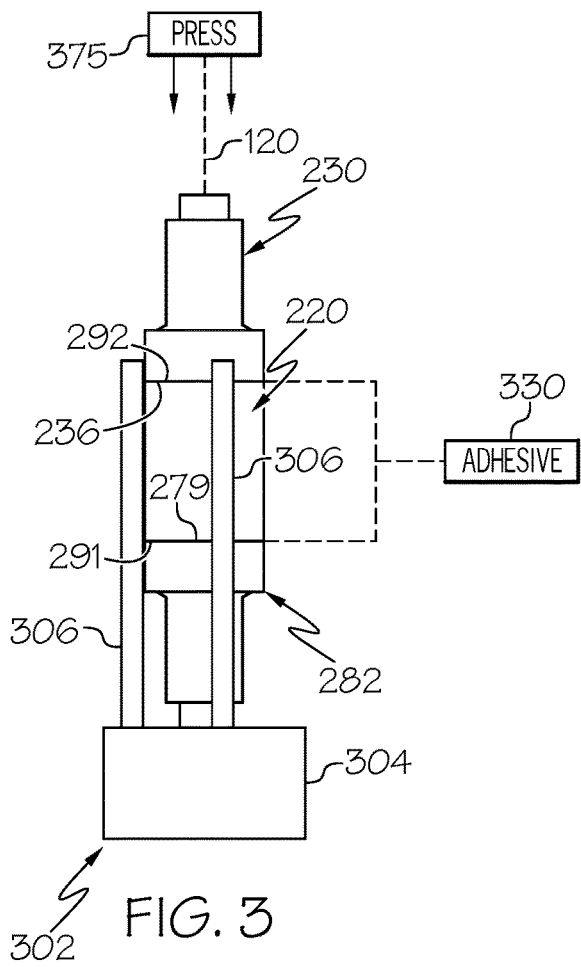
FIG. 3 is a side view of a tooling fixture for handling parts of the rotor assembly of FIG. 2 during manufacture.
Figure 4:
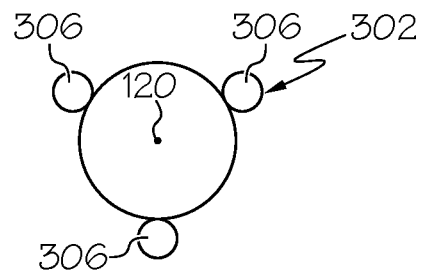
FIG. 4 is a top view of the tooling fixture and parts of the rotor assembly of FIG. 3.
Figure 5:
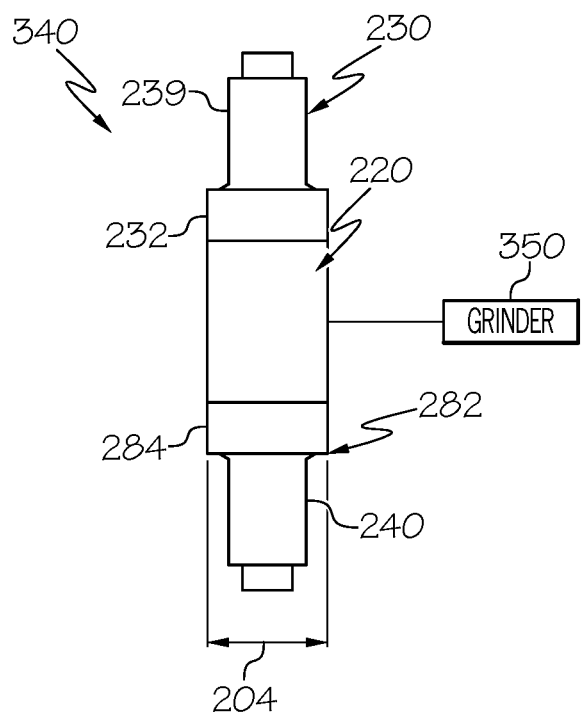
FIG. 5 is a side view of a portion of the rotor assembly of FIG. 2 according to example embodiments of the present disclosure.

Referring now to FIGS. 3-5, manufacture the rotor assembly 137 will be discussed according to example embodiments. The magnet member 220 may be sintered in some embodiments. The first and second shaft structures 282, 230 may be machined. Other manufacturing techniques may be used as well, such as additive manufacturing, or otherwise. These parts may be formed, surfaces may be precision-ground, cleaned, or otherwise prepared for attachment as represented in FIG. 3.

As shown in FIG. 3, during manufacture, the first and second shaft structures 282, 230 may be attached to opposite ends of the magnet member 220. In some embodiments, a tooling fixture 302 may be used for attaching these components.

In some embodiments, the tooling fixture 302 may include a base 304 and a plurality of retainer rods 306. The retainer rods 306 may extend from one side of the base 304 and may be axially straight. The retainer rods 306 may extend along the axis 120, and the tooling fixture 302 may be arranged such that the retainer rods 306 extend vertically upward from the base 304 (against the direction of gravitational force). In some embodiments, there may be at least three retainer rods 306 spaced apart equally about the axis 120 (e.g., spaced apart by 120 degrees).

Initially, the first shaft structure 282 and the magnet member 220 may be stacked on the tooling fixture 302 vertically with the axis 120 aligned with the direction of gravity and the magnet member 220 stacked atop the first shaft structure 282. The first shaft structure 282 and magnet member 220 may be attached while supported by the tooling fixture 302. In some embodiments, adhesive from an adhesive supply 330 may be applied between the longitudinal face 279 of the first shaft structure 282 and the first end 291 of the magnet member 220 for attaching these surfaces adhesively. The adhesive may be of any suitable type. The tooling fixture 302 may support the first shaft structure 282 and magnet member 220 substantially aligned and centered on the axis 120. In some embodiments, a press 375 may be used to compress the first shaft structure 282 and the magnet member 220 together. The parts may be heated in some embodiments to cure the adhesive.

Subsequently, in some embodiments, the second shaft structure 230 may be stacked on the opposite end of the magnet member 220 while stacked atop the first shaft structure 282 within the tooling fixture 302. Adhesive from the supply 330 may be applied between the longitudinal face 236 of the second shaft structure 230 and the second end 292 of the magnet member 220 for attaching these surfaces adhesively. The tooling fixture 302 may support the first shaft structure 282, the magnet member 220, and the second shaft structure 230 with the rods 306 surrounding, supporting, and aligning these components. In some embodiments, the press 375 may be used to compress the first shaft structure 282, the magnet member 220, and the second shaft structure 230 together along the axis 120 and against the base 304 of the tooling fixture 302. These parts may be heated, in some embodiments, to cure the adhesive.

In some embodiments, the adhesive may be cured and the resulting magnet shaft 340 (FIG. 5) may be removed from the tooling fixture 302. The magnet shaft 340 may be machined in some embodiments to as to remove material on the outer diameter surface(s), for example, to form high precision surfaces. In some embodiments, a grinder 350 may be used to grind the magnet member 220, the base 232, and the base 284 to the predetermined diameter 204. Furthermore, the grinder 350 may grind the bearing surfaces 239, 240 and/or other precision surfaces. Those having ordinary skill in the art will appreciate that manufacturing of the magnet shaft 340 may further include cleaning, polishing, heat treatment, and/or other processes.

Next, as illustrated in FIG. 2, the jacket member 210 may be placed over and may receive the assembled magnet shaft 340. In some embodiments, the jacket member 210 may be thermally fit to the magnet shaft 340. Also, the press 375 may be used to move the magnet shaft 340 into the jacket member 210.

In some embodiments, a welding tool 376 may be used to fixedly attach (i.e., add welds or weldments between) the jacket member 210 and the first shaft member 282. The welding tool 376 may also be used to fixedly attach (i.e., add welds or weldments between) the jacket member 210 and the second shaft structure 230. For example, spot welding, laser welding, or other types of welding processes may be used to produce one or more weldments that fixedly attach the jacket member 210 to the shaft structures 282, 230. The weldment(s) may be formed at equally spaced locations about the axis 120 or may be formed as a partial or continuous arcuate weldment about the axis 120. Thus, the rotor assembly 137 may be strong and robust.

Subsequently, the other components of the rotating group 118 may be attached to the rotor assembly 137. Furthermore, the rotating group 118 may be supported within the housing 119 as described above in relation to FIG. 1.

Accordingly, manufacture of the turbomachine 101 may be completed efficiently, repeatably, and accurately. The solid core magnet member 220 of the present disclosure may contribute to these improvements as explained above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A rotor assembly for a turbomachine having a permanent magnet electric motor that defines an axis of rotation comprising:
    a jacket member with a first jacket end and a second jacket end that are spaced apart along the axis of rotation, a longitudinal length of the jacket member defined along the axis of rotation from the first jacket end to the second jacket end, the jacket member including an inner diameter surface extending between the first jacket end and the second jacket end;
    a magnet member having a first longitudinal end and a second longitudinal end that are separated along the axis of rotation, the magnet member including a magnet outer diameter surface that is received in and that abuts the inner diameter surface of the jacket member;
    a first shaft structure that includes a first base and a first longitudinal face, the first base having a first outer diameter surface, the first longitudinal face being attached to the first longitudinal end and the first outer diameter surface received in and abutting the inner diameter surface of the jacket member;
    a second shaft structure that includes a second base and a second longitudinal face, the second base have a second outer diameter surface, the second longitudinal face being attached to the second longitudinal end and the second outer diameter surface received in and abutting the inner diameter surface of the jacket member;
    the magnet member being solitary and unitary, and having a solid core; and
    the first outer diameter surface, the second outer diameter surface, and the magnet outer diameter surface cooperatively defining a constant outer diameter along the longitudinal length from the first jacket end to the second jacket end.

2. The rotor assembly of claim 1, wherein at least one of the first shaft structure and the second shaft structure are adhesively attached to the magnet member.

3. The rotor assembly of claim 2, wherein both the first shaft structure and the second shaft structure are adhesively attached to the magnet member.

4. The rotor assembly of claim 1, further comprising a compressor wheel that is supported on a first longitudinal end of the rotor assembly, proximate the first shaft structure.

5. The rotor assembly of claim 4, further comprising a turbine wheel that is supported on a second longitudinal end of the rotor assembly, proximate the second shaft structure.

6. The rotor assembly of claim 1, wherein the inner diameter surface is interference fit to the first base, the magnet member, and the second base.

7. The rotor assembly of claim 1, wherein at least one of the first shaft structure and the second shaft structure includes a protruding end that protrudes from the jacket member, the protruding end having a smaller diameter than the constant outer diameter.

8. The rotor assembly of claim 7, wherein the first shaft structure and the second shaft structure both include a respective protruding end that protrudes from the jacket member and that has a smaller diameter than the constant outer diameter.

9. A method of manufacturing a rotor assembly for a turbomachine having a permanent magnet electric motor defining an axis of rotation comprising:
   providing a jacket member with a first jacket end and a second jacket end that are spaced apart along the axis of rotation, a longitudinal length of the jacket member defined along the axis of rotation from the first jacket end to the second jacket end, the jacket member including an inner diameter surface extending between the first jacket end and the second jacket end;
   providing a magnet member having a first longitudinal end and a second longitudinal end that are separated along the axis of rotation, the magnet member including a magnet outer diameter surface;
   providing a first shaft structure that includes a first base and a first longitudinal face, the first base having a first outer diameter surface;
   providing a second shaft structure that includes a second base and a second longitudinal face, the second base having a second outer diameter surface;
   attaching the first longitudinal face of the first shaft structure to the first longitudinal end and attaching the second longitudinal face of the second shaft structure to the second longitudinal end;
   receiving the magnet member within the sleeve member after attaching the first shaft structure to the first longitudinal end and after attaching the second shaft structure to the second longitudinal end, including abutting the first outer diameter surface, the magnet outer diameter surface, and the second outer diameter surface against the inner diameter surface of the jacket member;
   the magnet member being solitary and unitary and having a solid core; and
   the first outer diameter surface, the second outer diameter surface, and the magnet outer diameter surface cooperatively defining a constant outer diameter along the longitudinal length from the first jacket end to the second jacket end.

10. The method of claim 9, further comprising adhesively attaching at least one of the first shaft structure and the second shaft structure to the magnet member.

11. The method of claim 10, further comprising adhesively attaching both the first shaft structure and the second shaft structure to the magnet member.

12. The method of claim 9, further comprising supporting a compressor wheel on a first longitudinal end of the rotor assembly, proximate the first shaft structure.

13. The method of claim 12, further comprising supporting a turbine wheel on a second longitudinal end of the rotor assembly, proximate the second shaft structure.

14. The method of claim 9, further comprising interference fitting the jacket member over the first base, the magnet member, and the second base.

15. The method of claim 9, wherein at least one of the first shaft structure and the second shaft structure includes a protruding end that protrudes from the jacket member after receiving the magnet member within the jacket member, the protruding end having a smaller diameter than the constant outer diameter.

16. The method of claim 15, wherein the first shaft structure and the second shaft structure both include a respective protruding end that protrudes from the jacket member after receiving the magnet member within the jacket member.

17. The method of claim 9, further comprising supporting the first shaft structure, the magnet member, and the second shaft structure together within an alignment fixture that aligns the first shaft structure, the magnet member, and the second shaft structure along the axis of rotation.

18. A turbomachine comprising:
   a housing;
   a permanent magnet electric motor housed within the housing;
   a rotating group supported for rotation about an axis of rotation and configured to be driven in rotation about the axis of rotation by the motor, the rotating group including a rotor assembly, the rotor assembly comprising:
      a jacket member with a first jacket end and a second jacket end that are spaced apart along the axis of rotation, a longitudinal length of the jacket member defined along the axis of rotation from the first jacket end to the second jacket end, the jacket member including an inner diameter surface extending between the first jacket end and the second jacket end;
      a magnet member having a first longitudinal end and a second longitudinal end that are separated along the axis of rotation, the magnet member including a magnet outer diameter surface that is received in and that abuts the inner diameter surface of the jacket member;
      a first shaft structure that includes a first base and a first longitudinal face, the first base having a first outer diameter surface, the first longitudinal face being attached to the first longitudinal end and the first outer diameter surface received in and abutting the inner diameter surface of the jacket member;
      a second shaft structure that includes a second base and a second longitudinal face, the second base have a second outer diameter surface, the second longitudinal face being attached to the second longitudinal end and the second outer diameter surface received in and abutting the inner diameter surface of the jacket member;
      the magnet member being solitary and unitary, and having a solid core; and
      the first outer diameter surface, the second outer diameter surface, and the magnet outer diameter surface cooperatively defining a constant outer diameter along the longitudinal length from the first jacket end to the second jacket end.

* * * * *